US009094448B2

(12) United States Patent
Benefield

(10) Patent No.: US 9,094,448 B2
(45) Date of Patent: *Jul. 28, 2015

(54) METHODS AND SYSTEMS FOR EVALUATING SOFTWARE FOR KNOWN VULNERABILITIES

(71) Applicant: MasterCard International Incorporated, Purchase, NY (US)

(72) Inventor: William H. Benefield, Leopardstown (IE)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,623

(22) Filed: Aug. 22, 2014

(65) Prior Publication Data

US 2014/0366145 A1 Dec. 11, 2014

Related U.S. Application Data

(63) Continuation of application No. 13/619,097, filed on Sep. 14, 2012, now Pat. No. 8,844,045.

(51) Int. Cl.
*H04L 29/06* (2006.01)
*G06F 21/00* (2013.01)
*G06F 21/57* (2013.01)

(52) U.S. Cl.
CPC .......... *H04L 63/1433* (2013.01); *G06F 21/577* (2013.01); *H04L 63/1441* (2013.01)

(58) Field of Classification Search
CPC ... G06F 21/577; G06F 21/56; H04L 63/1416; H04L 63/1433; H04L 63/1441
See application file for complete search history.

(56) References Cited

U.S. PATENT DOCUMENTS

| 7,260,844 | B1 | 8/2007 | Tidwell et al. |
| 7,346,922 | B2 | 3/2008 | Miliefsky |
| 7,613,625 | B2 | 11/2009 | Heinrich |
| 7,743,421 | B2 | 6/2010 | Cosquer et al. |
| 7,861,299 | B1 | 12/2010 | Tidwell et al. |
| 8,201,257 | B1 | 6/2012 | Andres et al. |

(Continued)

FOREIGN PATENT DOCUMENTS

| JP | 2008197877 | A | 8/2008 |
| KR | 20120061335 | A | 6/2012 |
| WO | 2012011070 | A1 | 1/2012 |

OTHER PUBLICATIONS

PCT International Search Report and Written Opinion dated Dec. 30, 2013 for related matter PCT/US2013/059701.

*Primary Examiner* — Izunna Okeke
(74) *Attorney, Agent, or Firm* — Armstrong Teasdale LLP

(57) ABSTRACT

A vulnerability identification and resolution (VIR) computer device for identifying security vulnerabilities in a computer system is provided. The VIR computer device includes a memory device for storing data including data representing computing assets installed in the computer system and a processor in communication with the memory device. The VIR computer device is programmed to receive an asset identifier identifying a computing asset selected for evaluation and execute a query on at least one database storing security vulnerabilities, the query searching for security vulnerability data associated with the selected computing asset. The VIR computer device is further programmed to receive the security vulnerability data at the VIR computer device in response to the query.

20 Claims, 21 Drawing Sheets

(56) References Cited

U.S. PATENT DOCUMENTS

| | | |
|---|---|---|
| 2007/0067846 A1* | 3/2007 | McFarlane et al. ............ 726/25 |
| 2007/0169199 A1 | 7/2007 | Quinnell et al. |
| 2007/0192867 A1 | 8/2007 | Miliefsky |
| 2008/0005784 A1 | 1/2008 | Miliefsky |
| 2008/0201780 A1 | 8/2008 | Khan et al. |
| 2012/0185945 A1 | 7/2012 | Andres et al. |
| 2012/0216177 A1 | 8/2012 | Fink et al. |
| 2012/0304300 A1* | 11/2012 | LaBumbard ................... 726/25 |

* cited by examiner

CVE-2012-0053

| DESCRIPTION |
|---|
| protocol.c in the Apache HTTP Server 2.2.x through 2.2.21 does not properly restrict header information during construction of Bad Request (aka 400) error documents, which allows remote attackers to obtain the values of HTTPOnly cookies via vectors involving a (1) long or (2) malformed header in conjunction with crafted web script. |

802

SEVERITY

| BASE | 4.3 (Medium) | EXPLOIT | 8.6 (High) | IMPACT | 2.9 (Low) |
|---|---|---|---|---|---|
| ATK VECTOR | Network | COMPLEXITY | Medium | REQ. AUTH | None |
| PRIVACY | Partial | INTEGRITY | None | AVAIL | None |

804

[+] AFFECTED PRODUCTS

| | |
|---|---|
| ( 9) | Apache Software Foundation Apache HTTP Server 2.2.0 |
| ( 9) | Apache Software Foundation Apache HTTP Server 2.2.8 |
| ( 23) | Apache Software Foundation Apache HTTP Server 2.2.9 |
| ( 9) | Apache Software Foundation Apache HTTP Server 2.2.11 |
| ( ?) | Apache Software Foundation Apache HTTP Server 2.2.13 |
| ( 392) | Apache Software Foundation Apache HTTP Server 2.2.15 |
| ( 103) | Apache Software Foundation Apache HTTP Server 2.2.18 |
| ( 10) | Apache Software Foundation Apache HTTP Server 2.2.21 |

806

[+] VULNERABLE HOSTS

808

[+] EXTERNAL LINKS

| Modification | State was changed from Open to Manually Closed. |
|---|---|
| Changed By | Changed by e023083. |
| Change Date | Friday 10th of February 2012 01:26:39 PM |
| Reason | Friday 10th of February 2012 01:26:39 PM |

Item was addressed in configuration changes and does not apply.

| Row Color Key | |
|---|---|
| Bold Red | A Highly Critical Vulnerability Exists in this CVE. |
| Red | A Medium Priority Vulnerability Exists in this CVE. |
| Blue | This CVE is of low priority to address. |

Apache

| CVE ID | %Inst | B | I | E | Min Aff | Max Aff | Vec | Cmp | Ath | Cnf | Int | Avl |
|---|---|---|---|---|---|---|---|---|---|---|---|---|
| CVE-2010-0434 | 36 | 4 | 3 | 9 | 2.2.0 | 2.2.14 | N | M | N | P | N | N |
| CVE-2010-2791 | 23 | 5 | 3 | 10 | 2.2.9 | 2.2.9 | N | L | N | P | N | N |
| CVE-2011-4317 | 392 | 4 | 3 | 9 | 1.3.0 | 2.2.21 | N | M | N | N | P | N |
| CVE-2012-0031 | 392 | 5 | 6 | 10 | 1.0.0 | 2.2.21 | L | L | N | P | P | P |
| CVE-2012-0053 | 331 | 4 | 3 | 9 | 2.2.0 | 2.2.21 | N | M | N | P | N | N |
| CVE-2012-0883 | 392 | 7 | 10 | 3 | 0.8.11 | 2.4.1 | L | M | N | C | C | C |

JBoss

| CVE ID | %Inst | B | I | E | Min Aff | Max Aff | Vec | Cmp | Ath | Cnf | Int | Avl |
|---|---|---|---|---|---|---|---|---|---|---|---|---|
| CVE-2010-0738 | 200 | 5 | 3 | 10 | 4.2.0 | 4.3.0 | N | L | N | P | N | N |
| CVE-2010-1429 | 204 | 5 | 3 | 10 | 4.2.9 | 4.3.0 | N | L | N | P | N | N |

FIG. 17

| | | |
|---|---|---|
| CVE ID | The ID name of the CVE in question. | 1700 |
| # Inst | The number of instances marked as vulnerabe. | |
| B | The base CVSS score of the vulnerability. | |
| I | The impact CVSS score of the vulnerability. | |
| E | The exploitability CVSS score of the vulnerability. | |
| Min Aff | The minimum affected version of the vulnerability. | |
| Max Aff | The maximum affected version of the vulnerability. | |
| Vec | The attack vector (how an attacker can exploit the vulnerability). | |
| Cmp | The complexity of a potential exploit of the vulnerability. | |
| Ath | How many levels of authorization must be bypassed to exploit. | |
| Cnf | How much confidential data can be exposed by the vulnerability? | |
| Int | How much the vulnerability can affect the product's integrity? | |
| Avl | How impactful of availability the vulnerability is. | |

FIG. 18

| Row Color Key | |
|---|---|
| Red | Vulns Exist, Do Not Use |
| Blue | No Vulns Exist, OK to Use |

Apache

| Version | Major | Minor | #Vuln | TVuln | Servers | #Inst | OK? |
|---|---|---|---|---|---|---|---|
| 2.0.54 | 2 | 0 | 3 | 11 | 4 | 4 | |
| 2.0.55 | 2 | 0 | 3 | 11 | 6 | 10 | |
| 2.0.63 | 2 | 0 | 3 | 11 | 61 | 113 | |
| 2.0.65 | 2 | 0 | 0 | 0 | 0 | 0 | X |
| 2.1.10 | 2 | 1 | 0 | 0 | 0 | 0 | X |
| 2.2.8 | 2 | 2 | 5 | 15 | 4 | 4 | |
| 2.2.9 | 2 | 2 | 6 | 17 | 14 | 23 | |
| 2.2.11 | 2 | 2 | 5 | 16 | 4 | 4 | |
| 2.2.13 | 2 | 2 | 5 | 16 | 7 | 7 | |
| 2.2.15 | 2 | 2 | 4 | 13 | 111 | 391 | |
| 2.2.18 | 2 | 2 | 4 | 11 | 32 | 101 | |
| 2.2.21 | 2 | 2 | 4 | 8 | 12 | 17 | |
| 2.2.22 | 2 | 2 | 0 | 0 | 74 | 220 | X |
| 2.2.17 | 2 | 3 | 0 | 0 | 4 | 4 | X |
| 2.2.2 | 2 | 4 | 0 | 0 | 4 | 4 | X |

| Version | The product version. |
|---|---|
| Major | The product major version. |
| Minor | The product minor version. |
| #Vuln | The total number of vulnerabilities associated. |
| TVuln | The total base vulnerability score of all marked CVEs. |
| Servers | The number of servers that contain this version. |
| #Inst | The number of instances marked as vulnerable. |
| OK? | An X within this column indicates this version is OK to use. |

1900

METHODS AND SYSTEMS FOR EVALUATING SOFTWARE FOR KNOWN VULNERABILITIES

CROSS REFERENCE TO RELATED APPLICATIONS

This application is a continuation application of U.S. patent application Ser. No. 13/619,097, filed Sep. 14, 2012, entitled "METHODS AND SYSTEMS FOR EVALUATING SOFTWARE FOR KNOWN VULNERABILTIES", the disclosure of which are hereby incorporated herein by reference in its entirety.

BACKGROUND OF THE INVENTION

The field of the present disclosure relates to enterprise computer security and, more particularly, to computer-based methods and systems for retrieving known software vulnerability profiles (also referred to as a "CVE") from a central repository (e.g., database) of known vulnerabilities and identifying, based on the profiles, vulnerabilities that affect a plurality of computing assets.

A vulnerability is a flaw or weakness in a computer system's design, implementation, or operation and management that could be exploited to violate the system's security policy. Vulnerabilities are generally regarded as any aspect of a system or its components (e.g., computing asset) that allows a breach of security such as, but not limited to: executing commands as another user, accessing data contrary to access restrictions; posing as another entity; and conducting a denial of service attack. The impact of a security breach can be high. For example, a security breach can violate privacy laws and regulations that require organizations to secure private data stored within a computer system from release to unauthorized users.

One way to minimize the impact of vulnerabilities on a system is to perform periodic information technology security audits of the system and its components (e.g., computing assets). This systematic technical assessment measures a system's susceptibility to vulnerabilities. Audits can include interviewing staff, manually reviewing components for known vulnerabilities, reviewing application and operating system access controls, and analyzing physical access to the system. Systems can include computing assets such as personal computers, servers, mainframes, network routers, switches and other electronics which contain or facilitate the flow of data.

Known technology security audits utilize operators to evaluate the presence of vulnerabilities in software applications installed on computing assets in a computer system. The audits are performed on an application by application basis, comparing one or more lists of known vulnerabilities to a list of installed applications. These audits are time consuming and labor intensive, resulting in an audit frequency dictated by operator availability. Also, because conventional audits are performed manually, vulnerabilities discovered since the last update to the list of known vulnerabilities go undiscovered during the audit. Accordingly, the audits are time subjective. Additionally, upon discovery of a vulnerability, the operator must ascertain the resolution and apply it manually. Thus, known technology security audits fail to provide an accurate evaluation of known vulnerabilities in the installed application base of a computer system. Moreover, these known systems are unable to provide a real-time evaluation of vulnerabilities present in the computer system or its components.

Accordingly, it is desirable to evaluate technology assets for the presence of vulnerabilities in a rapid and accurate manner, and to provide vulnerability fixes to operators to speed the resolution of vulnerabilities.

BRIEF DESCRIPTION OF THE INVENTION

In one aspect, a vulnerability identification and resolution (VIR) computer device for identifying security vulnerabilities in a computer system is provided. The VIR computer device includes a memory device for storing data including data representing computing assets installed in the computer system and a processor in communication with the memory device. The VIR computer device is programmed to receive an asset identifier identifying a computing asset selected for evaluation and execute a query on at least one database storing security vulnerabilities, the query searching for security vulnerability data associated with the selected computing asset. The VIR computer device is further programmed to receive the security vulnerability data at the VIR computer device in response to the query.

In another aspect, a computer-implemented method for evaluating a computing asset of an entity using a vulnerability identification and resolution (VIR) computer device is provided, wherein the VIR computer device includes a memory device and a processor. The method includes receiving an asset identifier identifying a computing asset selected for evaluation. The method includes executing a query on at least one database storing security vulnerabilities, the query searching for security vulnerability data associated with the selected computing asset. The method includes receiving the security vulnerability data at the VIR computer device in response to the query.

In another aspect, one or more non-transitory computer-readable storage media having computer-executable instructions embodied thereon for evaluating a computing asset of an entity using a vulnerability identification and resolution (VIR) computer device is provided. The VIR computer device includes a memory device and a processor. When executed by the processor, computer-executable instructions cause the processor to receive an asset identifier identifying a computing asset selected for evaluation and execute a query on at least one database storing security vulnerabilities, the query searching for security vulnerability data associated with the selected computing asset. The computer-executable instructions also cause the processor to receive the security vulnerability data at the VIR computer device in response to the query.

BRIEF DESCRIPTION OF THE DRAWINGS

FIGS. 1-21 show example embodiments of the method and system described herein.

FIG. 1 is a simplified block diagram of an example embodiment of an asset evaluation computer system including a vulnerability identification and resolution (VIR) computer device in accordance with one embodiment of the present invention.

FIG. 2 is an expanded block diagram of an example embodiment of a server architecture of an asset evaluation computer system, including the VIR computer device shown in FIG. 1 in accordance with one embodiment of the present invention.

FIG. 3 is a block diagram of an example embodiment of a user computer device as shown in FIGS. 1 and 2.

FIG. 4 is a block diagram of an example embodiment of a server computer device as shown in FIGS. 1 and 2.

FIG. 5 is a data flow diagram showing a process implemented by the VIR computer device shown in FIGS. 1 and 2 in accordance with one embodiment of the present invention.

FIG. 6 is a screenshot of a CVE listing screen from the VIR computer device shown in FIGS. 1 and 2 in accordance with an example embodiment of the present invention.

FIG. 7 is a screenshot of a CVE listing screen from the VIR computer device shown in FIGS. 1 and 2 in accordance with an example embodiment of the present invention.

FIG. 8 is a screenshot of a content window from the VIR computer device shown in FIGS. 1 and 2 in accordance with an example embodiment of the present invention.

FIG. 9 is a screenshot of an affected products screen from the VIR computer device shown in FIGS. 1 and 2 in accordance with an example embodiment of the present invention.

FIG. 10 is a screenshot of a vulnerable hosts screen from the VIR computer device shown in FIGS. 1 and 2 in accordance with an example embodiment of the present invention.

FIG. 11 is a screenshot of an external links screen from the VIR computer device shown in FIGS. 1 and 2 in accordance with an example embodiment of the present invention.

FIG. 12 is a screenshot of a CVE information screen from the VIR computer device shown in FIGS. 1 and 2 in accordance with an example embodiment of the present invention.

FIG. 13 is a screenshot of a CVE modification screen from the VIR computer device shown in FIGS. 1 and 2 in accordance with an example embodiment of the present invention.

FIG. 14 is a screenshot of a modified CVE screen from the VIR computer device shown in FIGS. 1 and 2 in accordance with an example embodiment of the present invention.

FIG. 15 is a screenshot of a reporting options menu screen from the VIR computer device shown in FIGS. 1 and 2 in accordance with an example embodiment of the present invention.

FIG. 16 is a screenshot of a CVE report screen from the VIR computer device shown in FIGS. 1 and 2 in accordance with an example embodiment of the present invention.

FIG. 17 is a CVE data table of the data illustrated in FIG. 16 in accordance with an example embodiment of the present invention.

FIG. 18 is a screenshot of an instance report screen from the VIR computer device shown in FIGS. 1 and 2 in accordance with an example embodiment of the present invention.

FIG. 19 is an instance data table of the data illustrated in FIG. 16 in accordance with an example embodiment of the present invention.

FIG. 20 is a screenshot of a high level overview screen from the VIR computer device shown in FIGS. 1 and 2 in accordance with an example embodiment of the present invention.

FIG. 21 is an example graph generated by the VIR computer device shown in FIGS. 1 and 2 illustrating the number of vulnerable instances of a vulnerability over time.

DETAILED DESCRIPTION OF THE INVENTION

The methods and systems described herein relate to a vulnerability identification and resolution system that is configured to retrieve known software vulnerability profiles from a central repository (e.g., database) of known vulnerabilities and identify, based on the profiles, vulnerabilities that affect a plurality of computing assets.

In one example embodiment, a computer program is provided, and the program is embodied on a computer readable medium. In another example embodiment, the system is executed on a single computer system with a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

The methods and systems described herein have a technical effect of facilitating communication between a vulnerability identification and resolution system executing on a first computer device and at least one database subsystem provided by a second computer device. Other technical effects, which are described herein, include vulnerability identification, vulnerability inventorying, and vulnerability resolution identification.

Figure 1:
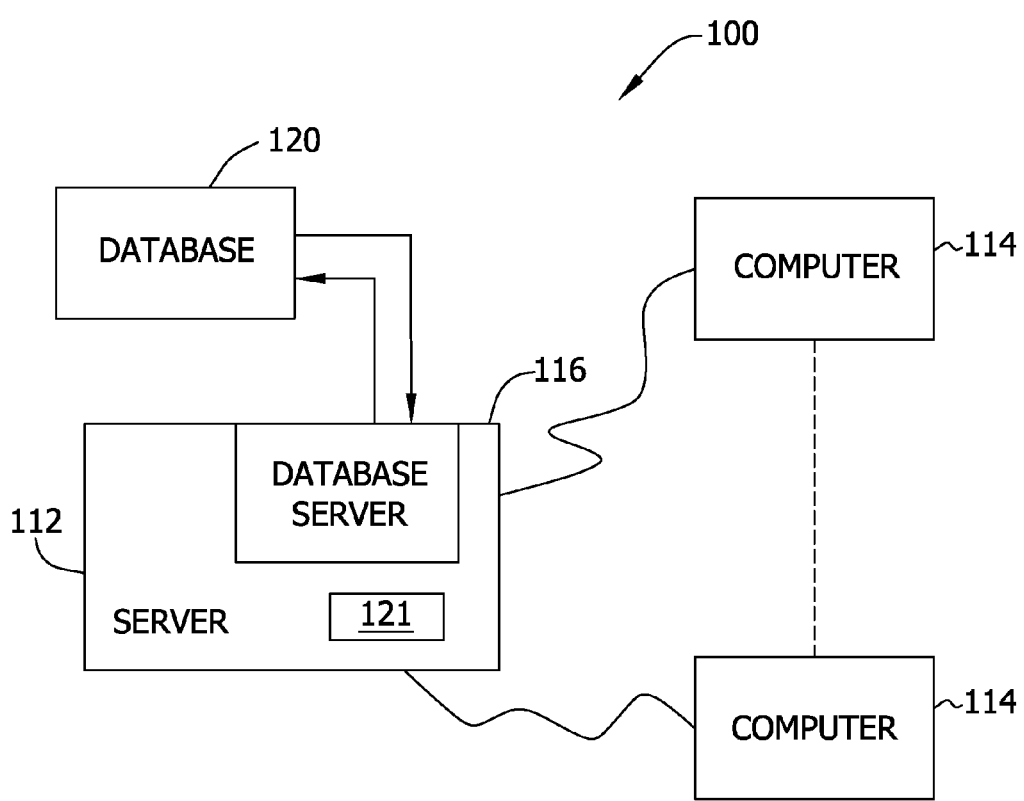

FIG. 1 is a simplified block diagram of an exemplary embodiment of a vulnerability identification and resolution system 100 including a vulnerability identification and resolution (VIR) computer device 121 in accordance with one embodiment of the present invention. In the example embodiment, computer system 100 is configured to compare one or more computing assets to a list of computing assets in a database containing vulnerabilities and vulnerability data associated with the computing assets. The computer system determines whether a computing asset of a computer system is affected by any vulnerability in the database and returns that information to the VIR computer device 121. The operator can then employ tools built into the VIR computer device 121 to access vulnerabilities and vulnerability data associated with the computer asset to administer a resolution (e.g., a fix or patch), making the asset no longer susceptible to a given vulnerability.

More specifically, in the exemplary embodiment, computer system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment. Server system 112 may be associated with any company having computer assets capable of being evaluated for vulnerabilities.

A database server 116 is connected to database 120, which contains information on a variety of matters, as described below in greater detail. In the exemplary embodiment, database 120 is a non-centralized database stored remotely from server system 112, and can be accessed by potential users at one of client systems 114 by logging onto server system 112 through one of client systems 114. Known vulnerabilities, discovered through many different channels, are tracked by a variety of publically accessible databases made available through the Internet. The database may be one of the Common Vulnerability and Exposure (CVE) database or the National Vulnerability Database (NVD). The Common Vulnerability and Exposure (CVE) database is a publicly available list of security vulnerability definitions maintained by MITRE Corporation. CVE is commercially available at http://cve.mitre.org. The National Vulnerability Database (NVD) is a comprehensive cyber security vulnerability database that integrates publicly available U.S. Government vulnerability resources and provides references to industry resources. NVD is a product of the National Institute of Science and Technology—Computer Security Division, is sponsored by the U.S. Department of Homeland Security—National Cyber Security Division, and is commercially available at http://nvd.nist.gov. CVE is a main repository of information relating to known vulnerabilities. CVE provides indexing and tracking of individual known vulnerabilities. NVD tracks descriptions of known vulnerabilities as well as their Common Vulnerability Scoring System (CVSS) ratings. CVSS ratings are based on a qualitative model of the impact of vulnerabilities. Two common uses of CVSS are prioritization of vulnerability remediation activities and in calculating the severity of vulnerabilities discovered in a computer system. NVD also contains information from the application vendor related to vulnerability manifestation and any fixes that have been created for removing the given vulnerability. In the example embodiment, database 120 may include any of these known vulnerabilities databases discussed herein.

In an alternate embodiment, database 120 may be a centralized database stored on server system 112 containing vulnerabilities as updated by an external source of known vulnerabilities.

System 100 also includes the VIR computer device 121, which may be connected to one or more client systems 114, and may be connected to server system 112. VIR computer device 121 can be interconnected to the Internet through various interfaces including a network, such as a LAN or a WAN, dial-in-connections, cable modems, wireless modems, and/or special high-speed ISDN lines. In one embodiment, VIR computer device 121 is located on server system 112 and can be accessed by potential users at one of client systems 114 by logging onto server system 112 through one of client systems 114. In an alternate embodiment, VIR computer device 121 may be non-centralized and is located remotely from server system 112.

In the example embodiment, each client system 114 is associated with a user and may be referred to as a user computer device 114. User computer device 114 may access and utilize VIR computer device 121 on server system 112. In one embodiment, user computer device 114 is a computer including a web browser, such that server system 112 is accessible to user computer device 114 using the Internet. User computer device 114 is interconnected to the Internet through many interfaces including a network, such as a local area network (LAN) or a wide area network (WAN), dial-in-connections, cable modems, and special high-speed ISDN lines.

User computer device 114 may also include a remote computing device, such as a web-based phone, smartphone, mobile phone, personal digital assistant (PDA), iPhone® (iPhone is a registered trademark of Apple, Incorporated located in Cupertino, Calif.), Android® (Android is a registered trademark of Google Incorporated, located in Mountain View, Calif.), and/or any device capable of executing stored computer-readable instructions. User computer device 114 can be associated with a subject matter expert or with another user utilizing system 100. User computer device 114 is configured to access service applications offered by the company and communicate with other user computer devices 114 within system 100.

Figure 2:
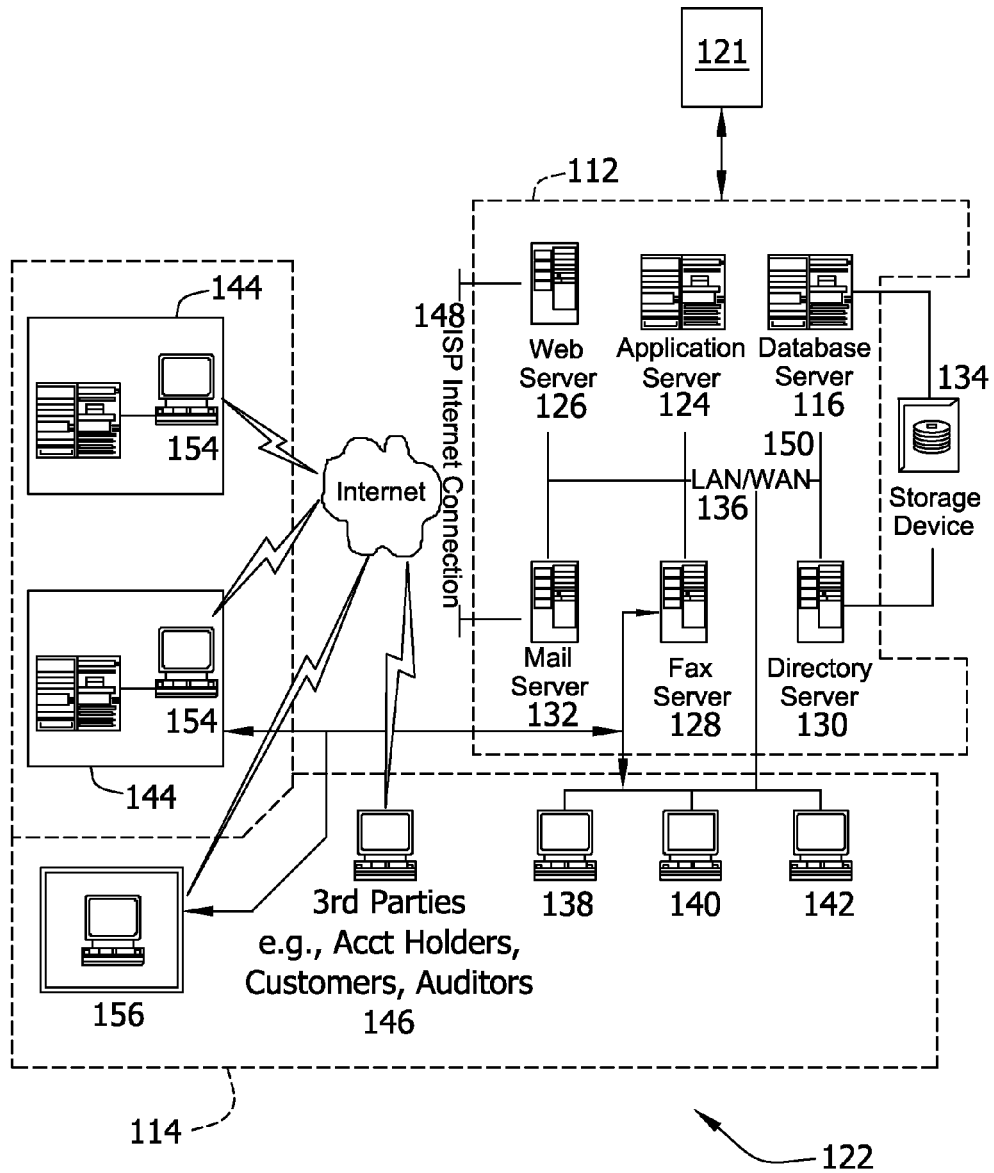

FIG. 2 is an expanded block diagram of a server architecture of a VIR system 122 including VIR computer device 121 (shown in FIG. 1) in accordance with one embodiment of the present invention. Components in system 122, identical to components of system 100 (shown in FIG. 1), are identified in FIG. 2 using the same reference numerals as used in FIG. 1. System 122 includes server system 112, client systems 114, and VIR computer device 121 (shown in FIG. 1). Server system 112 further includes database server 116 (shown in FIG. 1), a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer or a virtualized personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties (e.g., account holders, customers, auditors, developers, consumers, merchants, acquirers, issuers, etc.) 146 using an ISP Internet connection 148. The communication in the exemplary embodiment is illustrated as being performed using the Internet, however, any other wide area network (WAN) type communication can be utilized in other embodiments (e.g., the systems and processes are not limited to being practiced using the Internet). In addition, and rather than WAN 150, local area network 136 could be used in place of WAN 150.

In the exemplary embodiment, any authorized individual having a physical or virtualized workstation 154 can access system 122. At least one of the client systems includes a manager workstation 156 located at a remote location. Workstations 154 and 156 are personal computers or virtualized personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
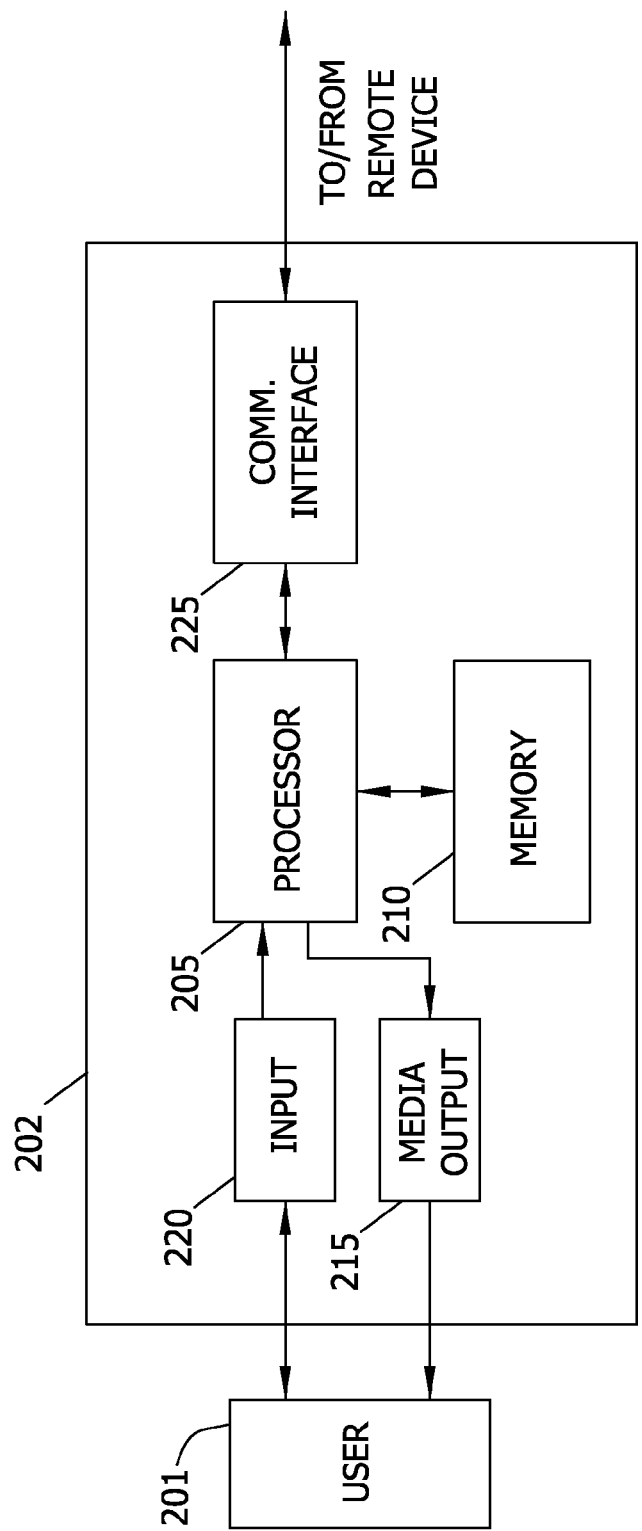

FIG. 3 illustrates an examplary configuration of a user computer device 202 operated by a user 201. User computer device 202 may include, but is not limited to, client systems 114, 138, 140, and 142, 146, workstation 154, and manager workstation 156 (all shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

User computer device 202 also includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which can be communicatively coupled to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112 (shown in FIGS. 1 and 2), including VIR computer device 121 (shown in FIGS. 1 and 2). A client application allows user 201 to interact with a server application from server system 112.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
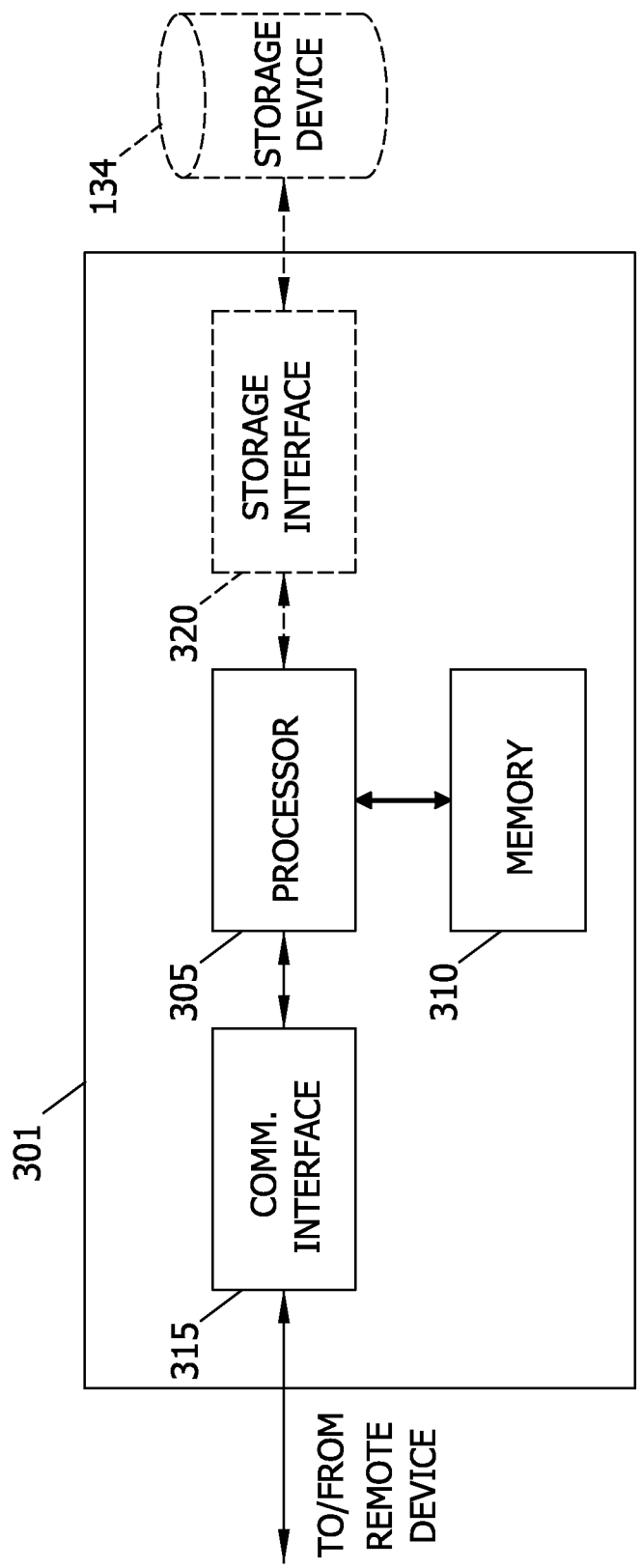

FIG. 4 illustrates an example configuration of a server system 301, such as server system 112 (shown in FIGS. 1 and 2). Server system 301 may include, but is not limited to, database server 116 (shown in FIGS. 1 and 2), VIR computer device 121 (shown in FIGS. 1 and 2), application server 124, web server 126, fax server 128, directory server 130, and mail server 132 (all shown in FIG. 2).

Server system 301 includes a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as user computer device 114 (shown in FIGS. 1 and 2), user computer device 202 (shown in FIG. 3), or another server system 301. For example, communication interface 315 may receive requests from user computer device 114 via the Internet, as illustrated in FIGS. 1 and 2.

Processor 305 may also be operatively coupled to a storage device 134 (shown in FIG. 2). Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to Server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
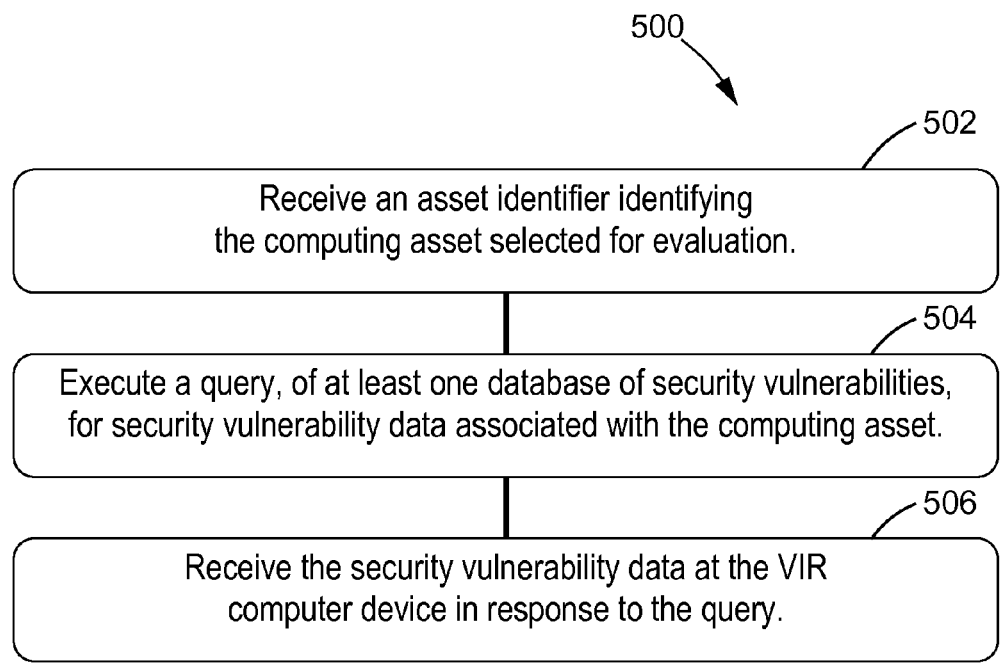

FIG. 5 is a data flow diagram 500 showing a process implemented by the VIR computer device 121 (shown in FIGS. 1 and 2) for identifying security vulnerabilities in a computer system in accordance with one embodiment of the present invention. In the example embodiment, VIR computer device 121 evaluates software applications. In alternate embodiments, VIR computer device 121 may evaluate any computer asset susceptible to a vulnerability. VIR computer device 121 utilizes a database 120 of known vulnerabilities to track and report on vulnerabilities that exist in computing assets of a computer system supported by a given organization. VIR computer device 121 is programmed to associate data obtained from an inventory application with publically available known vulnerability data. In the exemplary embodiment, VIR computer device 121 is programmed to utilize publically available known vulnerability data from databases maintained by the NIST as well as the CVE database. The VIR computer device 121 can be further programmed to retrieve vulnerability information from additional sources, and is not limited to the NIST databases and CVE database. The VIR computer device 121 is configured to compare a selected group of applications (or computing assets) with the data stored in the database 120. The VIR computer device 121 is programmed to track application versions that the given organization currently supports and indexes the application versions against the vulnerabilities that have been reported, providing a comprehensive listing of known vulnerabilities associated with each application version within the computer system. The database 120 can also include an inventory of each application (or computer asset) instance that exists in a computer system to be monitored. The VIR computer device 121 is written with an extensible framework that enables the use of a variety of inventory tools to be used with the device 121.

Referring to FIG. 5, during operation, an asset identifier is received 502 by the VIR computer device 121. The asset identifier can be a plurality of asset identifiers. The assets are computer assets, and are selected by a user, such as user 201. User 201 may also be referred to as analyst 201. VIR computer device 121 may display a list of asset identifiers identifying a plurality of computer assets on a display device, such as media output 215, for the analyst 201 to select from. The list is inclusive of all asset identifiers identifying all of the computing assets in the computer system. The VIR computer system 121 may then receive a plurality of asset identifiers identifying a plurality of computing assets selected for evaluation from an input device such as input 220.

Computer assets include computer software installed on server systems, personal computers and other computing devices, such as routers and gateways. Analyst 201 uses a computer device, such as user computer device 114 (shown in FIGS. 1 and 2), to interface with and operate VIR computer device 121. In the exemplary embodiment, VIR computer device 121 is stored on a server, for example, server 112 (shown in FIGS. 1 and 2).

For the specified computing asset or assets to be evaluated, VIR computer device 121 executes 504 a query on at least one database 120 storing security vulnerabilities. The query is designed to retrieve security vulnerability data associated with the computer asset or computer assets being evaluated. Security vulnerability data is queried for each of the selected plurality of assets. Security vulnerability data can include the following information relating to a given security vulnerability: a description of the security vulnerability, an evaluation of the severity of the vulnerability based on various metrics, the products affected by the vulnerability, external links related to the vulnerability such as links to a fix or patch, and other information useful in diagnosing and resolving vulnerabilities. In an alternative embodiment, the security vulnerability data can include any data that enables the VIR computer device 121 to operate as described herein.

After submission of the query to at least one database 120, VIR computer device 121 receives 506 security vulnerability data at the VIR computer device 121. The security vulnerability data may be referred to as "vulnerability data". In the exemplary embodiment, VIR computer device 121 stores the vulnerability data in a database, such as database 120 (shown in FIG. 1), so that it can be accessed in the future for other analysis. The VIR computer system 121 can, according to the exemplary embodiment, generate a graphical representation illustrating the security vulnerability data of each computing asset of the selected plurality of computing assets relative to all other computing assets included within the selected plurality of computing assets. The VIR computing device 121 may also electronically display, on media output 215, the security vulnerability data for an analyst 201 to review.

Each computing asset on the media output 215 may be selected by analyst 201 to view detailed vulnerability data including a recommendation of a planned action to take for the computing asset to be resolved of the vulnerability. The VIR computer device 121 may also store in a memory device, such as memory 210, memory 310 or storage device 134, the security vulnerability data in order to parse the data and present the data for use to an analyst 201.

The VIR computer device 121 can, according to the exemplary embodiment, parse the security vulnerability data to extract an affected software identifier and a proposed resolution identifier, wherein the affected software identifier identifies a computing asset affected by a security vulnerability. The proposed resolution identifier identifies a proposed resolution to resolve the security vulnerability. The VIR computer device 121 can also update the query periodically, such as when one of the databases of security vulnerabilities is updated.

It is recognized that all of the actions programmed into the VIR computer device 121 can be executed by a computer-implemented method for evaluating a computer asset of an entity using a VIR computer device. It is also recognized that the actions programmed into the VIR computer device 121 can be executed by one or more non-transitory computer-readable storage media having computer-executable instructions embodied thereon for evaluating a computing asset of an entity using a VIR computer device.

Figure 6:
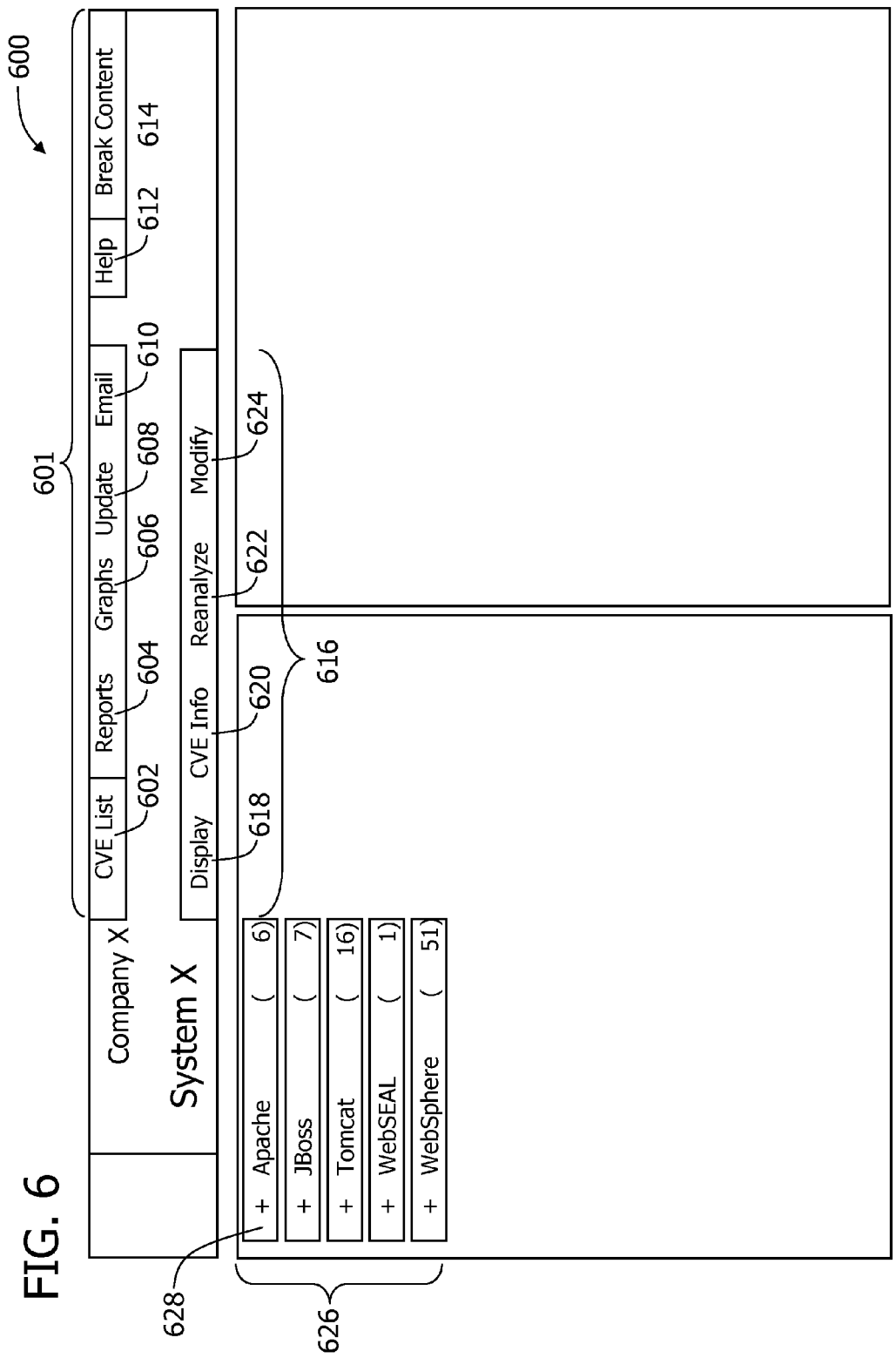

FIG. 6 is a screenshot of a CVE listing screen 600 from VIR computer device 121 (shown in FIGS. 1 and 2) in accordance with an example embodiment of the present invention. CVE listing screen 600 may be accessed via a user computer, such as user computer device 114 (shown in FIGS. 1 and 2). In the example embodiment, CVE listing screen 600 includes a series of primary tabs 601, including a CVE list screen selection tab 602, a reports screen selection tab 604, a graphs screen selection tab 606, an update selection tab 608, an email selection tab 610, a help selection tab 612, and a break content selection tab 614. The primary tabs 601 do not change as an analyst 201 navigates through the application. Below these tabs appears a context menu 616 containing tabs specific to the primary tab 601 selected. The context menu 616 changes as the analyst 201 navigates through the application. For the primary tab CVE List 602, the context menu 616 contains a display tab 618, a CVE information tab 620, a reanalyze tab 622, and a modify tab 624.

Figure 7:
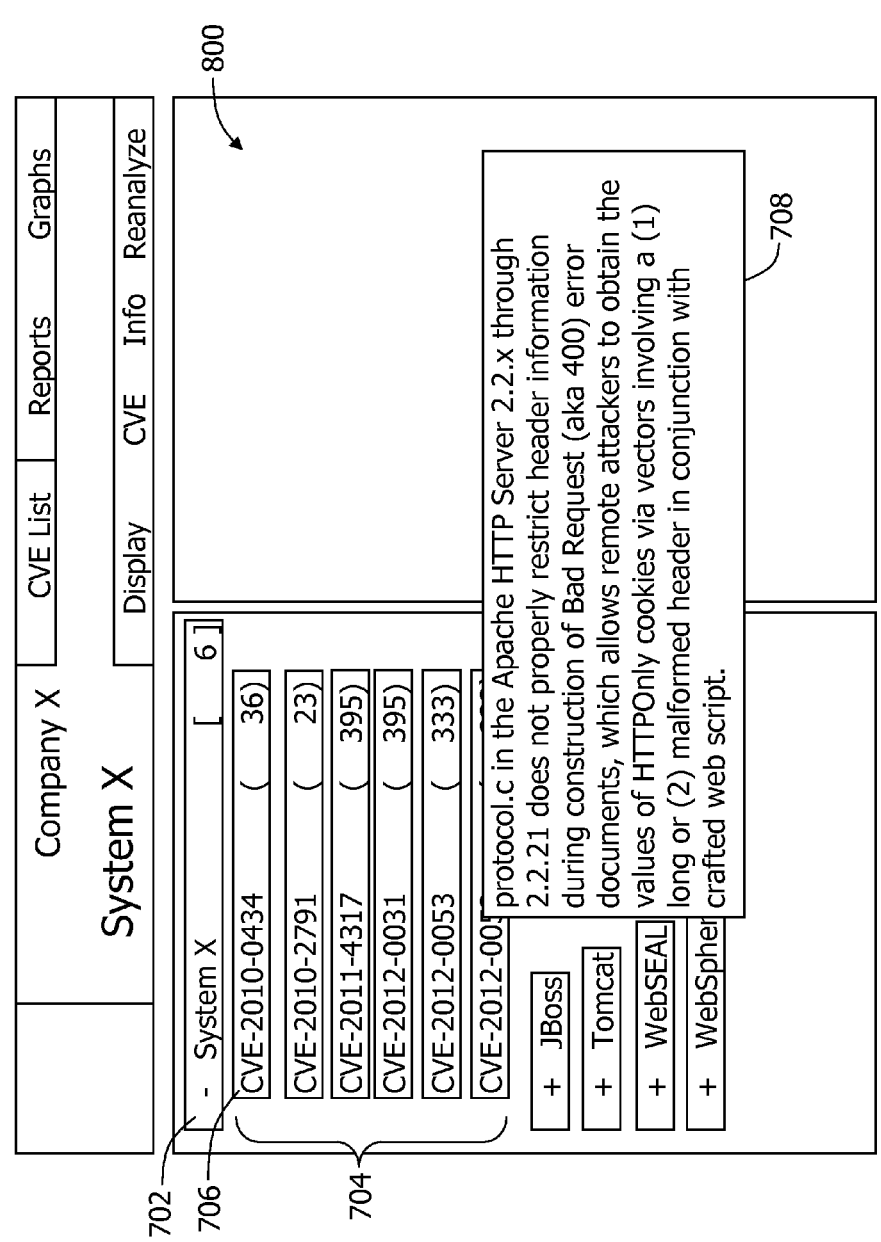

The CVE listing screen 600 is used to display a list of the vulnerabilities that the VIR computer device 121 has determined are applicable to the current computer assets in the computer system. In the exemplary embodiment, five applications 626 (e.g., computer assets) have been used by the VIR computer device 121 to ascertain relevant vulnerabilities: Apache (a product of the Apache Software Foundation), JBoss (a product of Red Hat, Inc.), Apache Tomcat (a product of the Apache Software Foundation), WebSEAL (a product of IBM, Inc.) and WebSphere® (a registered trademark and product of IBM, Inc.). From this CVE listing screen 600, the analyst 201 can see that Apache has six versions with vulnerabilities in the computer system. By expanding the Apache link using the "+" sign 628, the individual vulnerability versions 704 are listed, as shown in FIG. 7. Once expanded, a menu can be contracted again by clicking the "−" sign 702.

FIG. 7 is a screenshot 600 generated by VIR computer device 121 (shown in FIGS. 1 and 2) illustrating a list of individual vulnerability versions 704 for Apache. The CVE ID 706 is presented in a standard format: CVE-YYYY-NNNN, where YYYY represents the year in which the vulnerability was first submitted and NNNN represents the serial number of the vulnerability when it was submitted. The higher the serial number, the later in the year that the CVE was submitted. The number at the end of each CVE ID 706 indicates the number of instances that are currently marked as impacted by a given vulnerability in the computer system. Hovering over any CVE ID 706 will cause a tooltip 708 to appear that contains the description of that version of the vulnerability. By clicking on a CVE ID 706, information on that vulnerability version will appear in the content window 800 to the right of the listing of CVE IDs 706.

FIG. 8 is a screenshot 800 generated by VIR computer device 121 (shown in FIGS. 1 and 2) illustrating the content window 800 having a detailed listing of vulnerability data, including the vulnerability description 802, vulnerability severity 804, affected products 806, vulnerable hosts 808 and external links 810. The vulnerability description 802 matches the description shown in the tooltip 708 (shown in FIG. 7). Under the vulnerability severity 804 section, the analyst 201 can see various data points for the vulnerability. These data points give the analyst 201 information on how important a given vulnerability is. By hovering over any of the items, a description appears explaining what each data point represents. Although not shown in the figures, as a vulnerability increases in danger, the color that is displayed within the data points in this section also changes. This particular vulnerability is highly exploitable, as indicated by the 8.6 value in the vulnerability severity 804 section, and so it is colored differently than the impact score, which is only a 2.9 value. The values that appear in the vulnerability severity 804 section are CVSS values. These values are important in trying to prioritize which vulnerabilities to address first, and which are relatively minor in scope.

Under the affected products 806 section, a list is displayed that contains, by default, the first and last products indexed as well as any versions of that product that have been detected within the current computer system as having vulnerabilities. By expanding this window, as shown in FIG. 9, all versions that manifest a given vulnerability are displayed in the content window 800.

Figure 9:
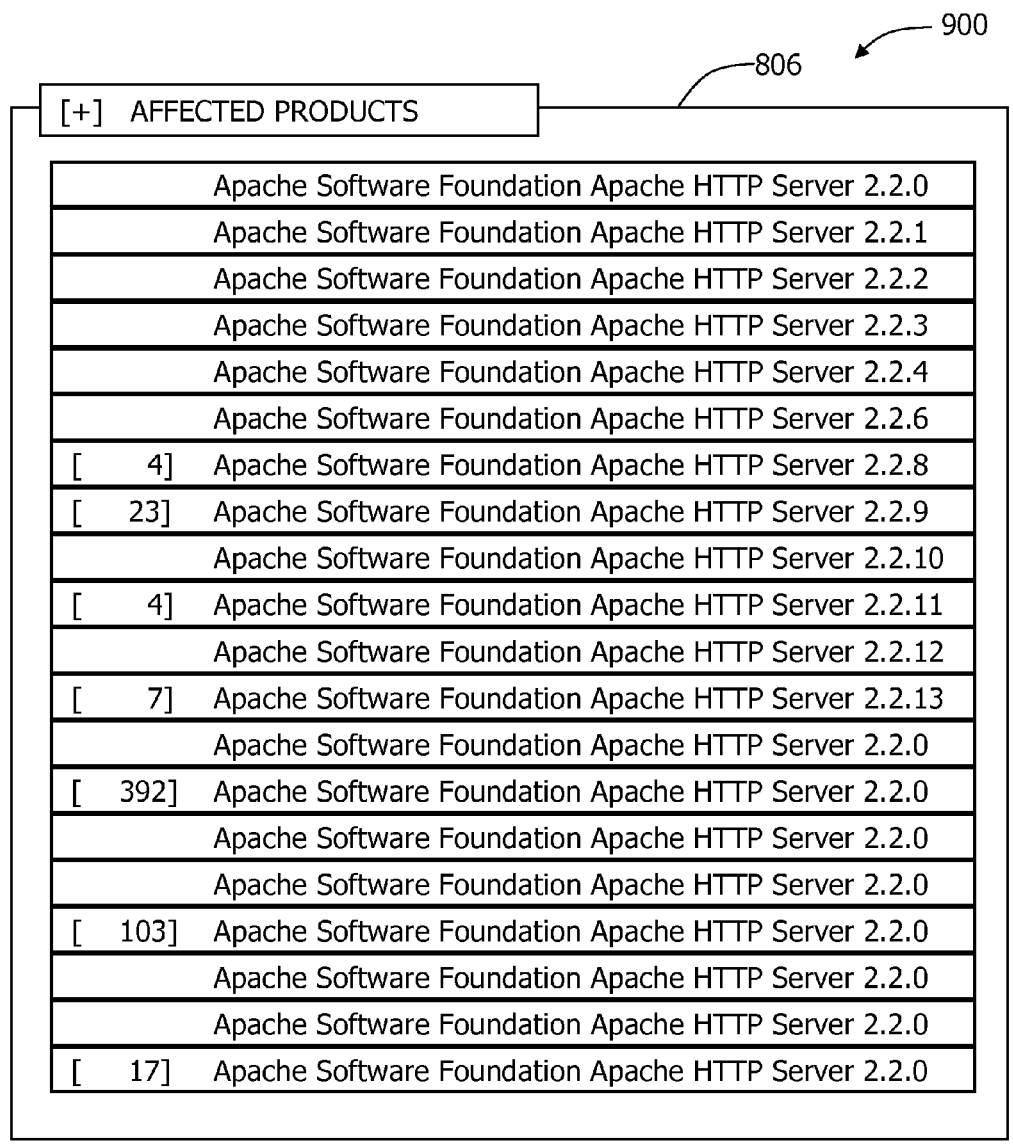

In FIG. 9, which is a screenshot 900 generated by VIR computer device 121 (shown in FIGS. 1 and 2), the number at the start of each line is the number of application instances that run the vulnerability affected version within the computer system.

Figure 10:
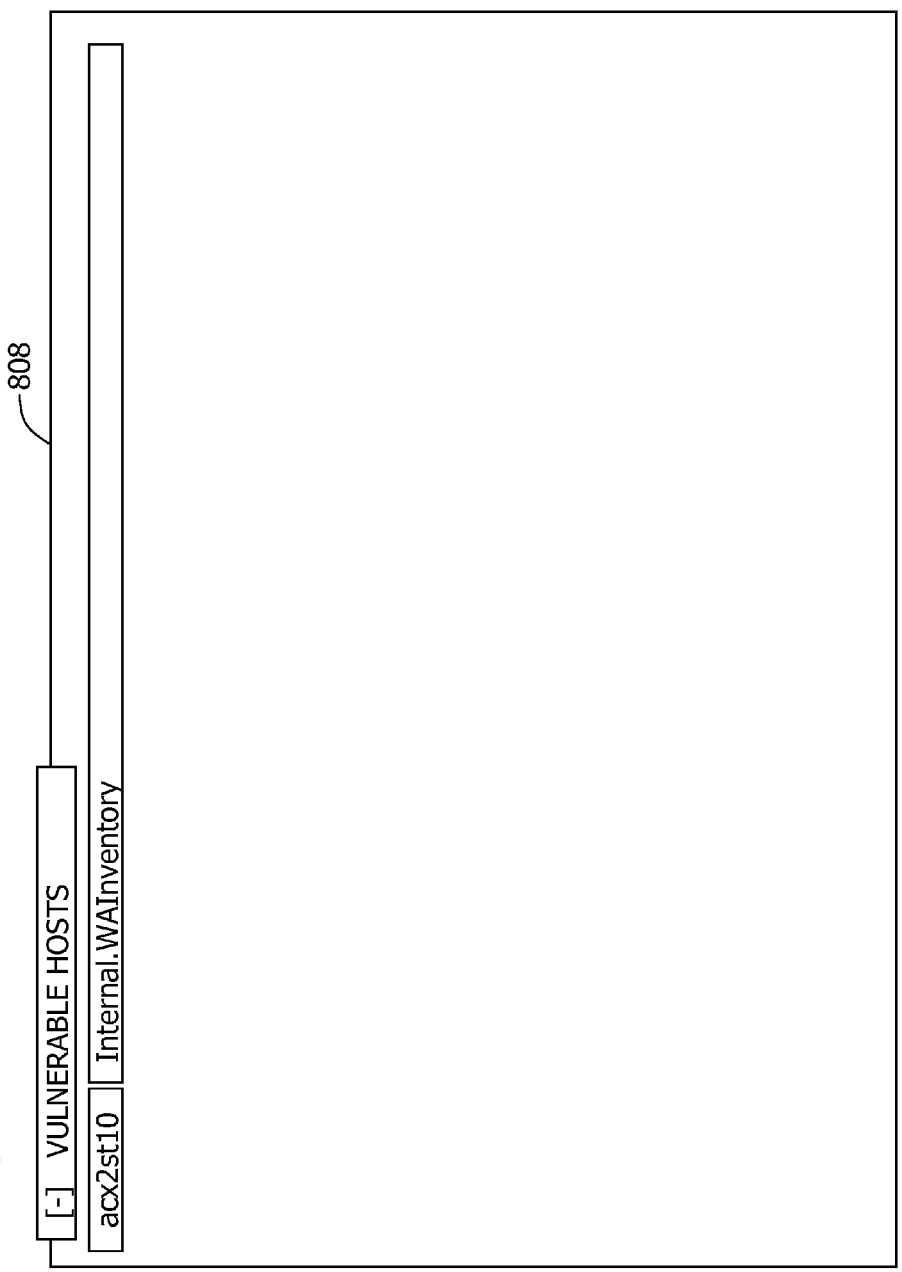

In FIG. 10, which is a screenshot 1000 generated by VIR computer device 121 (shown in FIGS. 1 and 2), the vulnerable hosts 808 data populates the content window 800 (shown in FIG. 8). This list is for all servers and application server names that are marked as containing the vulnerability. Only the very top of this list is illustrated, as the list is very large for this particular example. Using the information provided on this screen, the analyst 201 can pinpoint which servers or other computing assets should be fixed and prioritize the patching of the instances on the computing assets that are most important.

Figure 11:
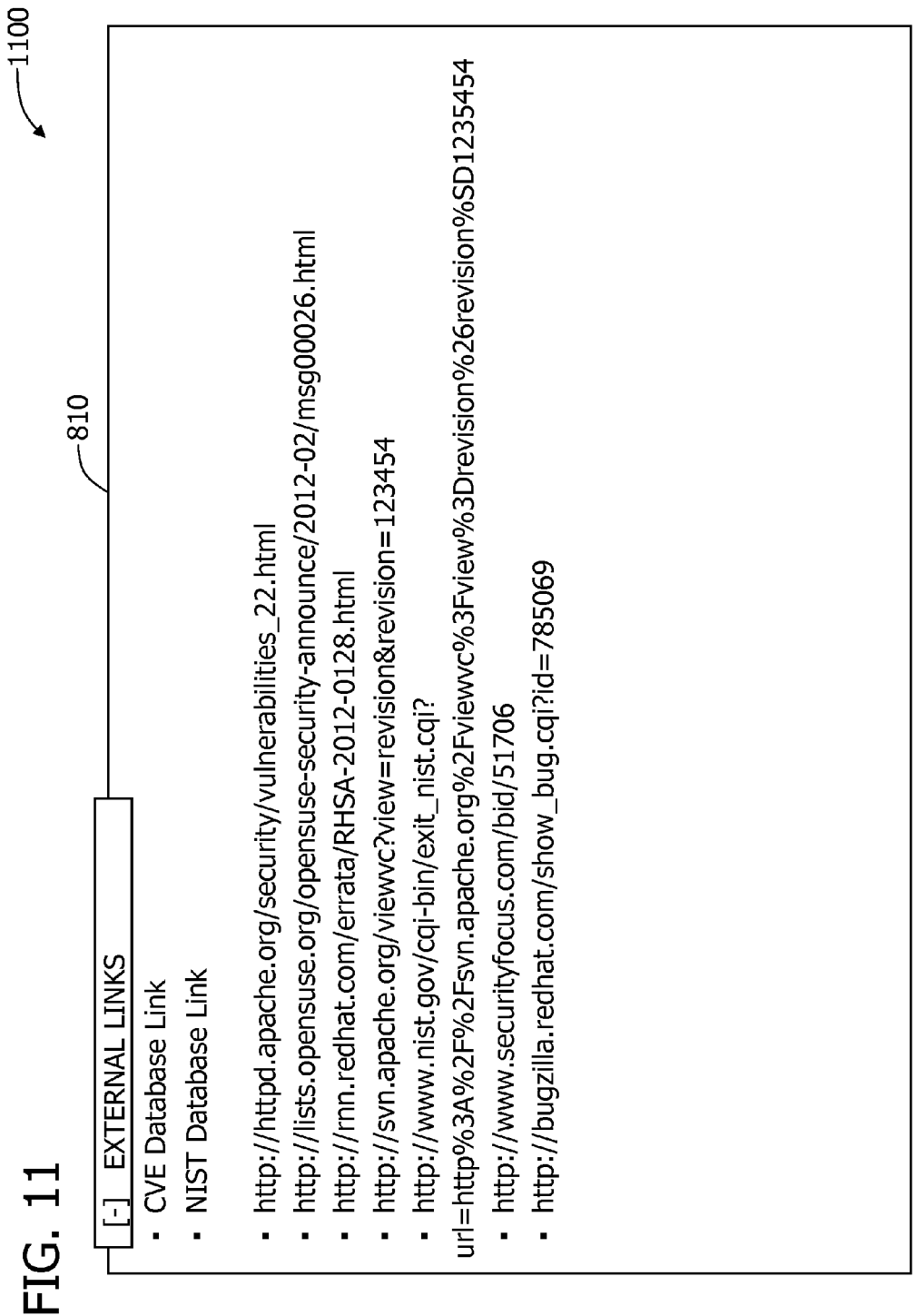

In FIG. 11, which is a screenshot 1100 generated by VIR computer device 121 (shown in FIGS. 1 and 2), the external links 810 (shown in FIG. 8) section is shown. This list contains all of the links pulled from both the CVE database and the NIST databases that refer to the particular vulnerability. Clicking on any of these hyperlinks will open those links in a new window. Some of these links contain additional information for troubleshooting the particular vulnerability, and some will contain fixes offered by the product vendor for addressing and resolving the particular vulnerability.

Figure 12:
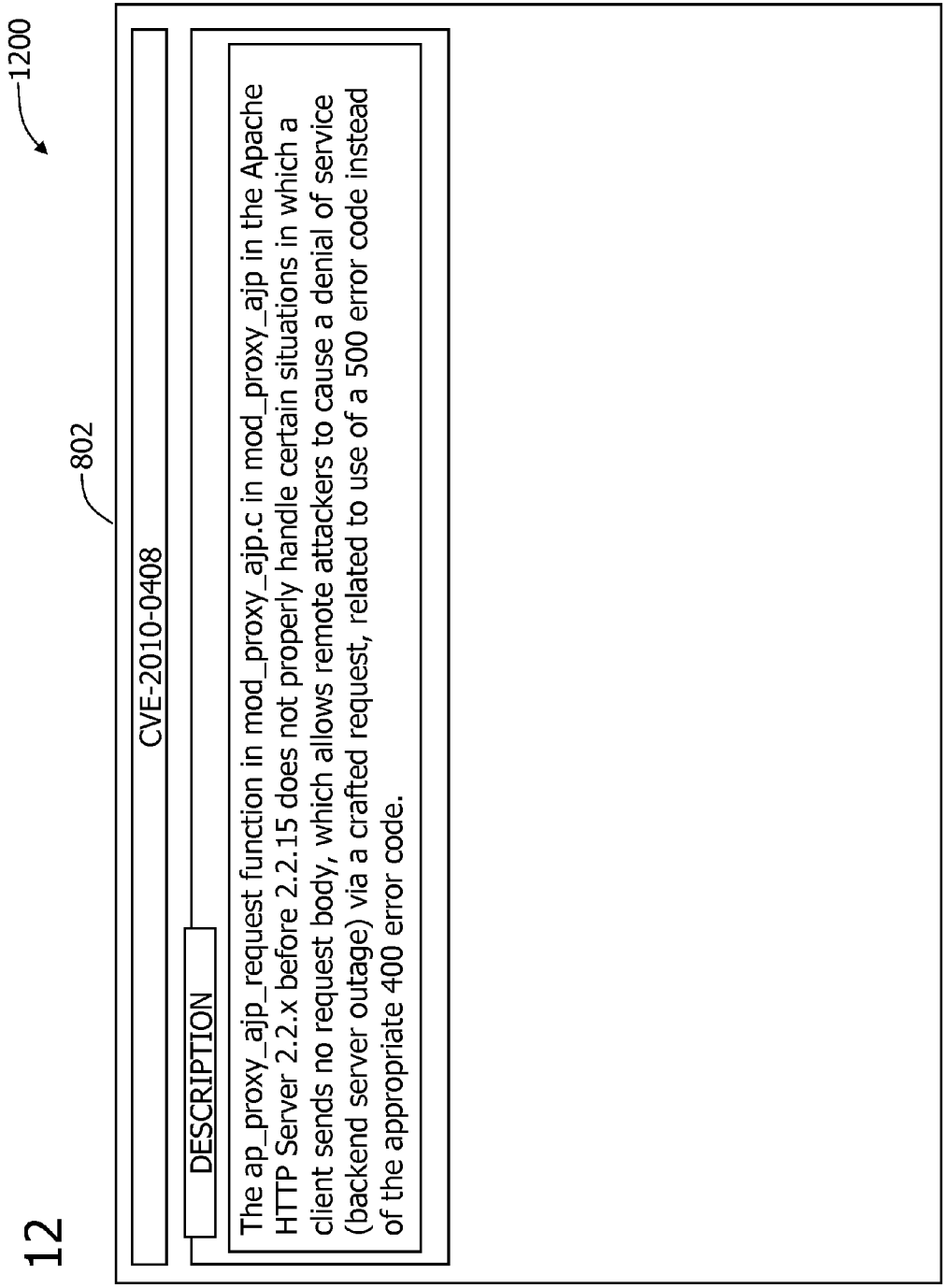

In FIG. 12, which is a screenshot 1200 generated by VIR computer device 121 (shown in FIGS. 1 and 2), the result of clicking the CVE information tab 620 in the context menu 616 is illustrated. If the analyst 201 navigates to any submenu or navigates away from the last vulnerability viewed, clicking the CVE list screen selection tab 602 will redisplay the information for that vulnerability.

Clicking on the reanalyze tab 622 in the context menu 616 will cause the VIR computer system 121 to reparse the information it gathered for the specific vulnerability being viewed. The reparsing consists of contacting the databases 120 and downloading any new information about the vulnerability, then indexing any new information for viewing by the analyst 201.

Figure 13:
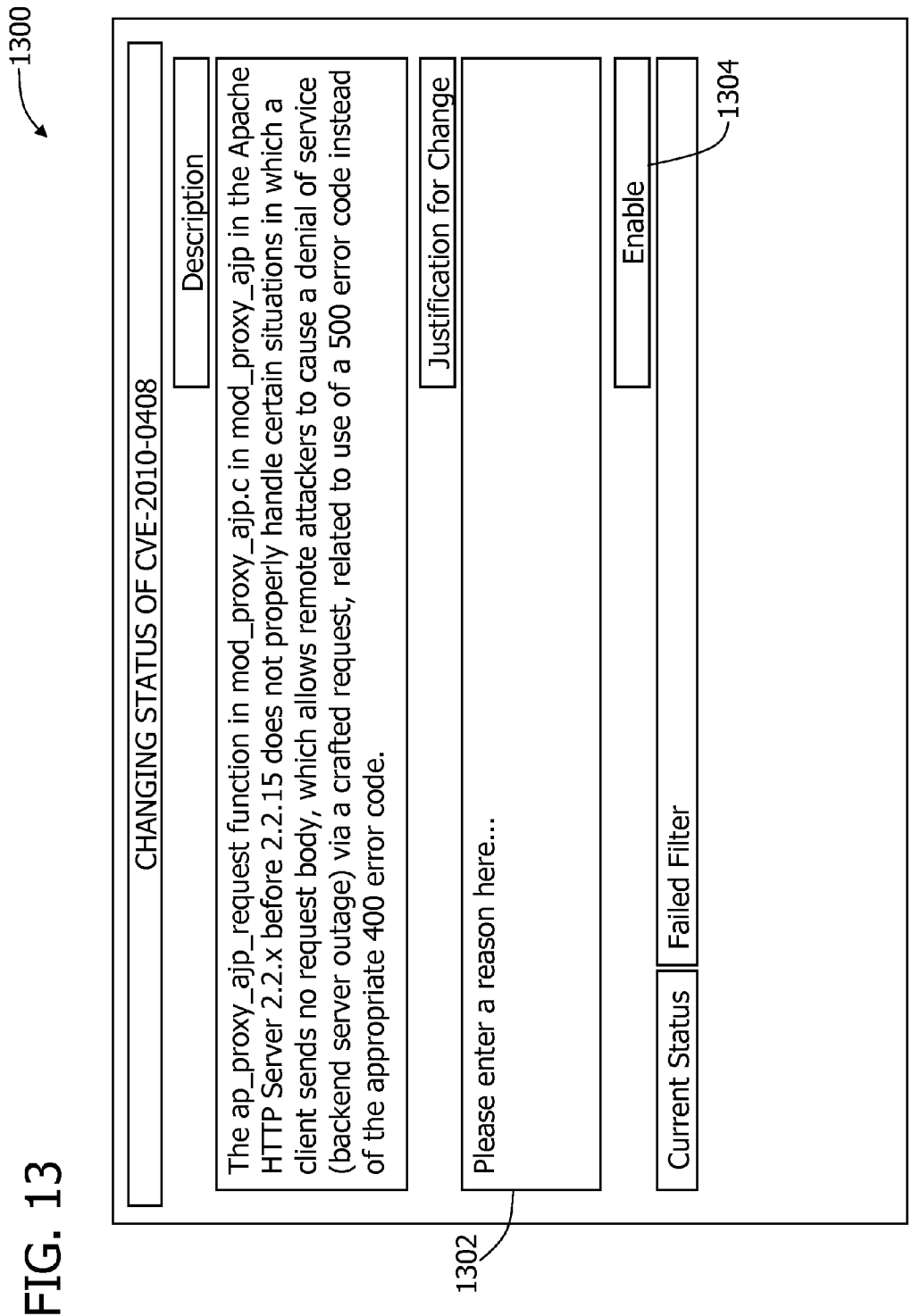

FIG. 13, which is a screenshot 1300 generated by VIR computer device 121 (shown in FIGS. 1 and 2), illustrates the result of clicking the modify tab 624 in the context menu 616. The modify tab 624 allows a user to change the observed state of the vulnerability to either apply or not apply to the computer system. This function determines whether or not the vulnerability will be measured in reports and graphs. In order to change the status of a vulnerability, a reason must be entered in the justification box 1302. As illustrated, because this particular vulnerability is already disabled, the submit button 1304 reads enable. Entering a reason and clicking the submit button 1304 will enable the vulnerability as being applicable to the computer system, and the vulnerability will then be included in reports and graphs. Once the status of a vulnerability has been manually changed, viewing the status of that vulnerability will display a new box that displays information about the vulnerability and why it was changed, as is shown in FIG. 14. FIG. 14 is a screenshot 1400 generated by VIR computer device 121 (shown in FIGS. 1 and 2).

Figure 15:
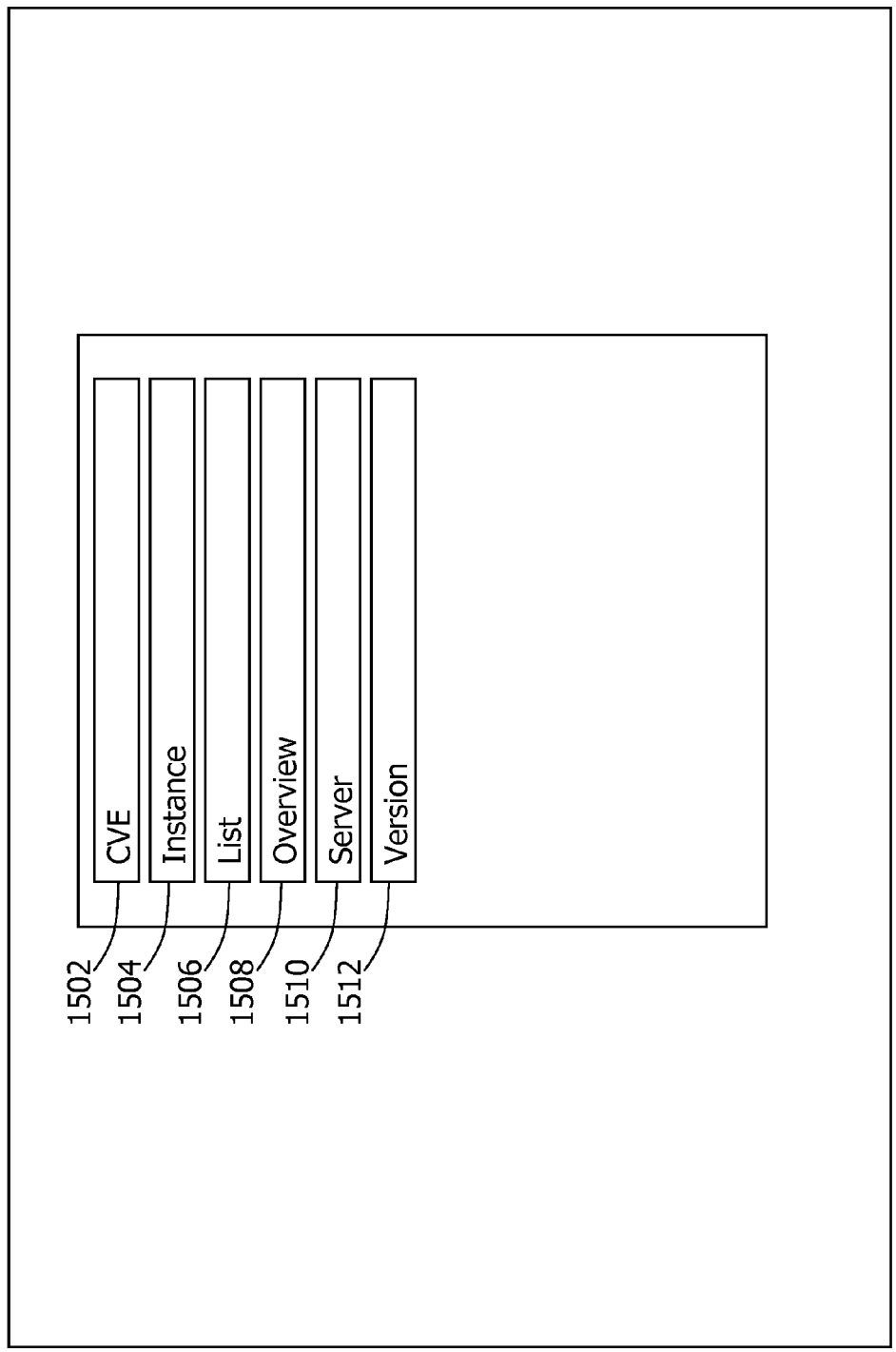

As shown in FIG. 15, which is a screenshot 1500 generated by VIR computer device 121 (shown in FIGS. 1 and 2), clicking the reports screen selection tab 604 (shown in FIG. 6) causes the left-most navigation panel to change and display reporting options menu 1500. The menu 1500 includes a CVE option 1502, an instance option 1504, a list option 1506, an overview option 1508, a server option 1510, and a version option 1512.

As shown in FIG. 16, which is a screenshot 1600 generated by VIR computer device 121 (shown in FIGS. 1 and 2), clicking the CVE option 1502 (shown in FIG. 15) will cause a CVE report 1600 to be displayed in the content window 800. The information displayed within this report is shown in the CVE data table 1700 of FIG. 17.

As shown in FIG. 18, which is a screenshot 1800 generated by VIR computer device 121 (shown in FIGS. 1 and 2), clicking the instance option 1504 in the reports screen selection tab 604 will cause an instance report 1800 to be displayed in the content window 800. The information displayed within this report is shown in the instance data table 1900 of FIG. 19. In FIG. 18, rows marked in certain colors indicate that the particular version has an open vulnerability and should not be used for new installations or upgrades. Rows marked in another color indicate that the version is a preferred version with no open vulnerabilities.

Clicking the list option 1506 will pull the data for all open vulnerabilities and display it in a desired format, for example a CSV, or comma separated value format. This makes the data transferrable from the VIR Computer Device to a spreadsheet application for generating additional reports or creating additional data sets.

Figure 20:
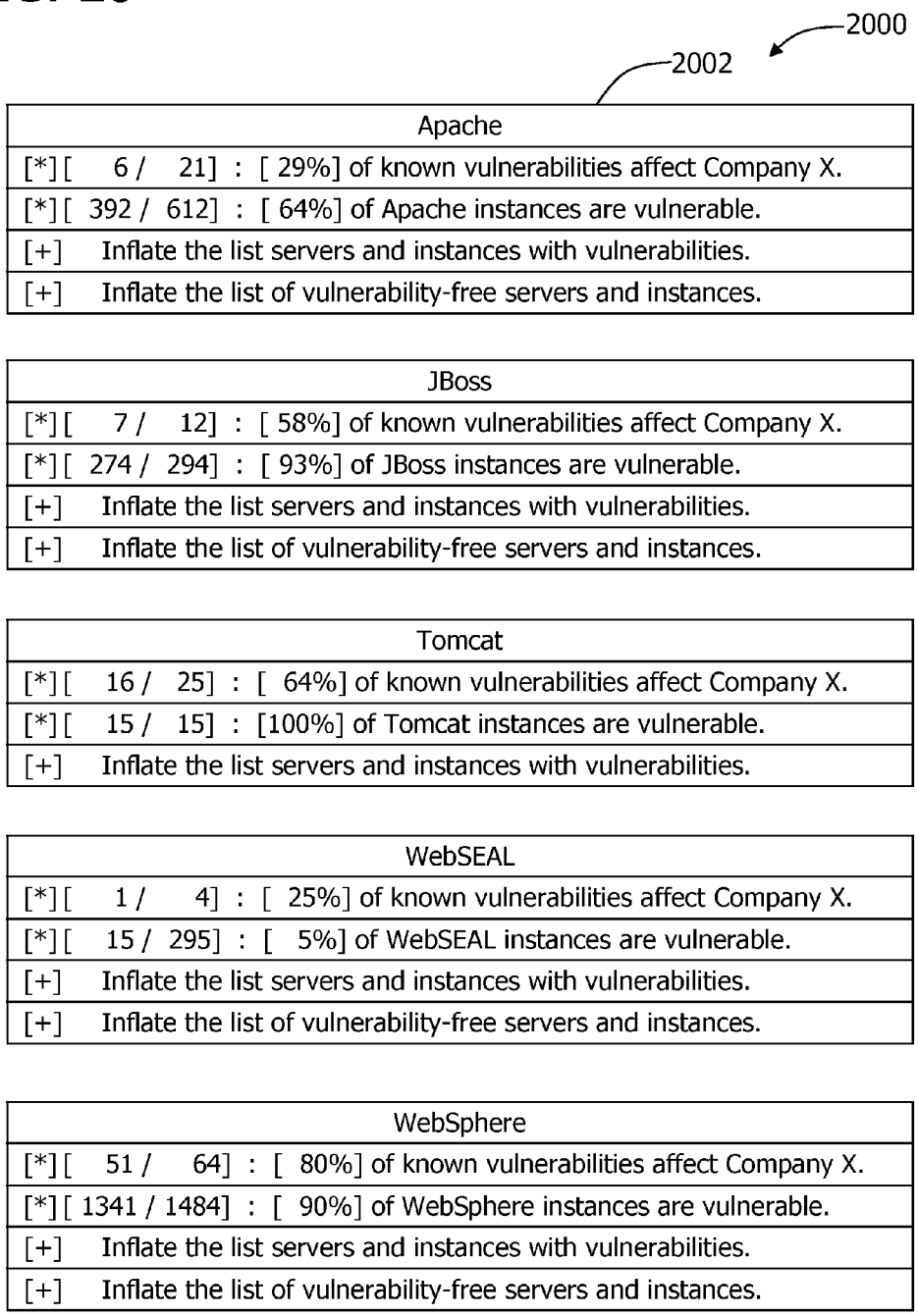

As shown in FIG. 20, which is a screenshot 2000 generated by VIR computer device 121 (shown in FIGS. 1 and 2), selecting the overview option 1508 will populate the content window 800 with a high level overview 2002 of the computer system across all supported technologies and application versions.

Clicking the server option 1510 will generate a report listing all of the technologies and versions that exist on each individual server within the computer system. Clicking the version option 1512 will generate a report listing all of the technologies by application version and give a list of servers that contain that particular version in the computer system.

Figure 21:
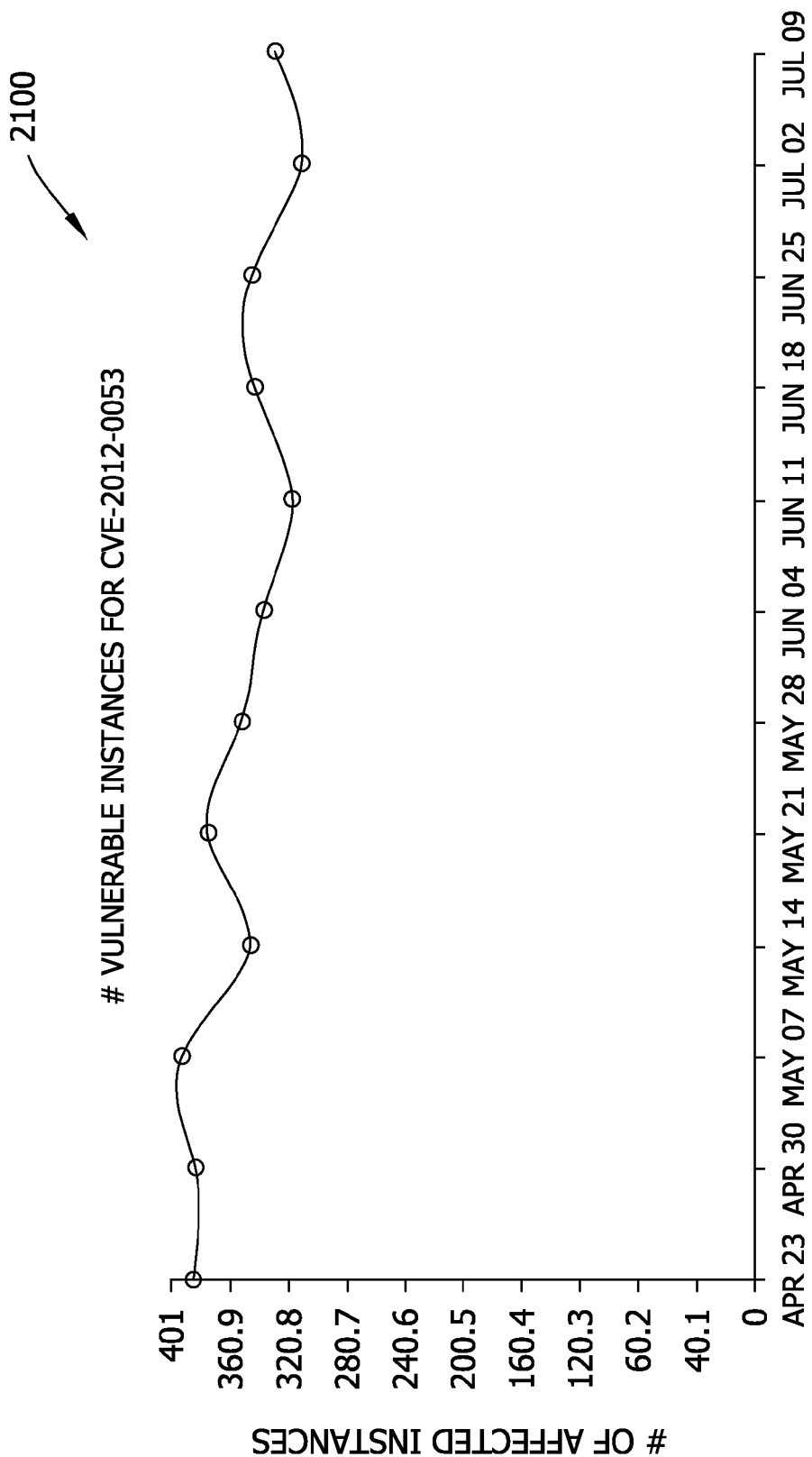

By selecting the graphs screen selection tab 606, the context menu 616 changes to list the following options: CVE; Overview; and Version. The CVE graphs will give the analyst 201 a view of the instances of computer assets affected by a given vulnerability over time. Clicking on CVE will enable the analyst 201 to select a particular vulnerability for graphing. As shown in FIG. 21, a CVE graph 2100 is shown illustrating the number of vulnerable instances for a particular vulnerability over time. Selecting the Overview option provides a status of affected instances across all versions of a technology, inclusively. Clicking on Overview changes the left most menu to offer the following options: All, Apache, JBoss, Tomcat, WebSEAL, WebSphere. By selecting Apache, for example, a graph is displayed illustrating the history of the number of vulnerable Apache instances over time. By selecting the Version submenu option, a list of the number of instances that are running a specific version of a technology over time is displayed. Selecting a particular version will cause a graph to appear showing the number of vulnerability instances for that particular software version over time.

The update selection tab 608 (shown in FIG. 6) allows any user to perform an automated data update of the application. Additionally, this function is performed several times a day automatically, to periodically update the VIR computer device 121. When the update selection tab 608 is selected, the content window 800 (shown in FIG. 7) is broken up into four windows, each of which will update as the VIR computer device 121 retrieves data from the database 120. When the four sections indicate that the update is complete, the VIR computer device 121 has been fully updated.

The email selection tab 610 (shown in FIG. 6) allows an analyst 201 to select what pieces of automated notification they'd like to receive. The VIR computer device 121 has mail server to send email content. Automated notifications can be set such that the analyst 201 receives no alerts, all alerts, alerts for newly added vulnerabilities, status changes to nonapplicable, status changes to applicable, alerts on vulnerable application installation. Automated notifications can also be set to be delivered based on technology type. If the analyst only wants to receive alerts on specific technologies, they can select those technologies.

The help selection tab 612 will display a help page for navigating through the VIR Computer device 121.

The break content selection tab 614 allows the user to break the data from the content window 800 into a separate window to enable printing of the content.

The above-described methods and systems provide for identifying security vulnerabilities in a computer system and patching those security vulnerabilities. Moreover, the methods and systems described herein facilitate (i) receiving, at a VIR computer device 121, an asset identifier identifying the computing asset selected for evaluation; (ii) executing a query, on at least one database storing security vulnerabilities, for security vulnerability data associated with the computing asset; and (iii) receiving the security vulnerability data at the VIR computer device 121 in response to the query.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vulnerability identification and resolution (VIR) computer device for identifying security vulnerabilities in a computer system, said VIR computer device comprising:
   a memory device for storing data including data representing computing assets installed in the computer system; and
   a processor in communication with said memory device, said VIR computer device programmed to:
      execute a query on at least one database storing security vulnerabilities, the query searching for security vulnerability data associated with a selected computing asset from a plurality of computing assets of an organization;
      receive said security vulnerability data at the VIR computer device in response to the query, wherein the security vulnerability data includes a security vulnerability identifier that identifies a security vulnerability and a proposed resolution identifier that identifies a proposed resolution;

provide proposed resolution data associated with the proposed resolution, the proposed resolution configured to resolve the security vulnerability when applied to the selected computing asset; and electronically display an impact score, wherein the impact score indicates a qualitative determination of an impact of the security vulnerability associated with the selected computing asset.

2. A VIR computer device in accordance with claim 1, wherein said VIR computer device is further programmed to:

track the plurality of computing assets based on the data stored within the memory device, wherein each computing asset includes an asset version;

provide a plurality of asset identifiers to a user computer device, wherein each asset identifier is configured to identify at least one asset version of the plurality of computing assets;

receive at least one asset identifier selection from the user computer device identifying the at least one asset version of the computing asset, wherein the asset identifier selection is selected from the plurality of asset identifiers; and cause to be displayed at least one asset version and at least one instance, wherein each asset identifier identifies a single instance and a single asset version.

3. A VIR computer device in accordance with claim 1, wherein said VIR computer device is further programmed to:

generate a graphical representation illustrating the security vulnerability data of each computing asset of a selected plurality of computing assets relative to all other computing assets included within the selected plurality of computing assets.

4. A VIR computer device in accordance with claim 1, wherein the selected computing asset comprises more than one selected computing asset, and wherein an impact score is displayed for each selected computing asset.

5. A VIR computer device in accordance with claim 1, wherein said VIR computer device is further programmed to:

electronically display said security vulnerability data, wherein security vulnerability data includes at least one of:

a list of affected computing asset instances; and a list of vulnerable hosts.

6. A VIR computer device in accordance with claim 1, wherein said VIR computer device is further programmed to:

parse said security vulnerability data to extract an affected software identifier and the proposed resolution identifier, wherein the affected software identifier identifies the computing asset affected by one or more security vulnerabilities; and wherein the proposed resolution includes at least one of diagnostic information, troubleshooting steps, and links to a fix or patch.

7. A VIR computer device in accordance with claim 1, wherein said VIR computer device is further programmed to:

update the query, when said at least one database of security vulnerabilities is updated.

8. A computer-implemented method for evaluating a computing asset of an entity using a vulnerability identification and resolution (VIR) computer device, wherein the VIR computer device includes a memory device and a processor, said method comprising:

executing a query on at least one database storing security vulnerabilities, the query searching for security vulnerability data associated with a selected computing asset from a plurality of computing assets of an organization;

receiving said security vulnerability data at the VIR computer device in response to the query, wherein the security vulnerability data includes a security vulnerability identifier that identifies a security vulnerability and a proposed resolution identifier that identifies a proposed resolution;

providing proposed resolution data associated with the proposed resolution, the proposed resolution configured to resolve the security vulnerability when applied to the selected computing asset; and electronically displaying an impact score, wherein the impact score indicates a qualitative determination of an impact of the security vulnerability associated with the selected computing asset.

9. A computer-implemented method in accordance with claim 8, further comprising:

tracking the plurality of computing assets based on the data stored within the memory device, wherein each computing asset includes an asset version;

providing a plurality of asset identifiers to a user computer device, wherein each asset identifier is configured to identify at least one asset version of the plurality of computing assets;

receiving at least one asset identifier selection from the user computer device identifying the at least one asset version of the computing asset, wherein the asset identifier selection is selected from the plurality of asset identifiers; and providing at least one asset version and at least one instance, wherein each asset identifier identifies a single instance and a single asset version.

10. A computer-implemented method in accordance with claim 8, further comprising:

generating a graphical representation illustrating the security vulnerability data of each computing asset of a selected plurality of computing assets relative to all other computing assets included within the selected plurality of computing assets.

11. A computer-implemented method in accordance with claim 8, wherein the selected computing asset comprises more than one selected computing asset, and wherein an impact score is displayed for each selected computing asset.

12. A computer-implemented method in accordance with claim 8, further comprising:

displaying, electronically, said security vulnerability data, wherein security vulnerability data includes at least one of:

a list of affected computing asset instances; and a list of vulnerable hosts.

13. A computer-implemented method in accordance with claim 8, wherein providing the proposed resolution further comprises:

parsing said security vulnerability data to extract an affected software identifier and the proposed resolution identifier, wherein the affected software identifier identifies the computing asset affected by one or more security vulnerabilities; and wherein the proposed resolution includes at least one of diagnostic information, troubleshooting steps, and links to a fix or patch.

14. A computer-implemented method in accordance with claim 8, further comprising:

updating the query, when said at least one database of security vulnerabilities is updated.

15. One or more non-transitory computer-readable storage media having computer-executable instructions embodied thereon for evaluating a computing asset of an entity using a vulnerability identification and resolution (VIR) computer device, wherein the VIR computer device having at least one processor coupled to at least one memory device, the computer-executable instructions cause the at least one processor to, wherein when executed by said processor, the computer-executable instructions cause the at least one processor to:

execute a query on at least one database storing security vulnerabilities, the query searching for security vulnerability data associated with a selected computing asset from a plurality of computing assets of an organization;

receive said security vulnerability data at the VIR computer device in response to the query, wherein the security vulnerability data includes a security vulnerability identifier that identifies a security vulnerability and a proposed resolution identifier that identifies a proposed resolution;

provide proposed resolution data associated with the proposed resolution, the proposed resolution configured to resolve the security vulnerability when applied to the selected computing asset; and electronically display an impact score, wherein the impact score indicates a qualitative determination of an impact of the security vulnerability associated with the selected computing asset.

16. The one or more non-transitory computer-readable storage media in accordance with claim 15, wherein the computer-executable instructions further cause the at least one processor to:

track the plurality of computing assets based on the data stored within the memory device, wherein each computing asset includes an asset version;

provide a plurality of asset identifiers to a user computer device, wherein each asset identifier is configured to identify at least one asset version of the plurality of computing assets;

receive at least one asset identifier selection from the user computer device identifying the at least one asset version of the computing asset, wherein the asset identifier selection is selected from the plurality of asset identifiers; and provide at least one asset version and at least one instance, wherein each asset identifier identifies a single instance and a single asset version.

17. The one or more non-transitory computer-readable storage media in accordance with claim 15, wherein the computer-executable instructions further cause the at least one processor to:

generate a graphical representation illustrating the security vulnerability data of each computing asset of a selected plurality of computing assets relative to all other computing assets included within the selected plurality of computing assets.

18. The one or more non-transitory computer-readable storage media in accordance with claim 15, wherein the selected computing asset comprises more than one selected computing asset, and wherein an impact score is displayed for each selected computing asset.

19. The one or more non-transitory computer-readable storage media in accordance with claim 15, wherein the computer-executable instructions further cause the at least one processor to:

parse said security vulnerability data to extract an affected software identifier and the proposed resolution identifier, wherein the affected software identifier identifies the computing asset affected by one or more security vulnerabilities; and wherein the proposed resolution includes at least one of diagnostic information, troubleshooting steps, and links to a fix or patch.

20. The one or more non-transitory computer-readable storage media in accordance with claim 15, wherein the computer-executable instructions further cause the at least one processor to:

update the query, when said at least one database of security vulnerabilities is updated.

\* \* \* \* \*